(12) United States Patent
Fernald et al.

(10) Patent No.: US 7,653,757 B1
(45) Date of Patent: Jan. 26, 2010

(54) METHOD FOR USING A MULTI-MASTER MULTI-SLAVE BUS FOR POWER MANAGEMENT

(75) Inventors: Kenneth W. Fernald, Austin, TX (US); James W. Templeton, Austin, TX (US); John A. Wishneusky, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 6 days.

(21) Appl. No.: 11/198,698

(22) Filed: Aug. 5, 2005

Related U.S. Application Data (60) Provisional application No. 60/599,369, filed on Aug. 6, 2004.

(51) Int. Cl.
*G06F 3/00* (2006.01)
*G05F 1/40* (2006.01)

(52) U.S. Cl. .......................... 710/3; 323/282; 323/222; 713/340

(58) Field of Classification Search .................. 323/282, 323/222; 713/300, 340; 710/120, 3
See application file for complete search history.

(56) References Cited

U.S. PATENT DOCUMENTS

| | | | |
|---|---|---|---|
| 5,117,430 A | 5/1992 | Berglund | |
| 5,646,509 A | 7/1997 | Berglund et al. | |
| 5,675,480 A | 10/1997 | Stanford | |
| 5,935,252 A | 8/1999 | Berglund et al. | |

(Continued)

FOREIGN PATENT DOCUMENTS

WO    WO 02/31943 A2    4/2002

OTHER PUBLICATIONS

V. C. H. Nicholas, C. T. Lau, and B. S. Lee; "A Power LAN for Telecommunication Power Supply Equipment"; IEEE Conference on Computer, Communication, Control and Power Engineering (TENCON, Region 10); Oct. 1993; pp. 24-27; vol. 3; Beijing.

(Continued)

*Primary Examiner*—Niketa I Patel
*Assistant Examiner*—Ernest Unelus
(74) *Attorney, Agent, or Firm*—Meyertons Hood Kivlin Kowert & Goetzel, P.C.; Jeffrey C. Hood (57) ABSTRACT

In one set of embodiments, a power management system comprises two or more devices, such as POL devices, configured to transmit and receive data over a shared bus, such as an I2C bus, according to the bus protocol of the shared bus. Each device may be configured with at least one respective address register, which may be programmed with an address uniquely identifying the device, and a mask register that may be configured to mask select bits of the respective address register, thereby enabling the device to identify device groups. In one embodiment, one of the devices identifying itself as a master device may distribute information to any of the other devices by transmitting the information, which may include commands and/or data, to itself, in effect targeting the address programmed into its own address register. The devices on the shared bus may be configured to monitor the bus for events, and respond to each event according to the requirements inherent within a transmitted command, thereby performing the necessary tasks to enable power management functions without the need for interconnecting analog signal lines.

42 Claims, 5 Drawing Sheets

U.S. PATENT DOCUMENTS

| | | | |
|---|---|---|---|
| 6,003,139 A * | 12/1999 | McKenzie | 713/300 |
| 6,079,026 A | 6/2000 | Berglund et al. | |
| 6,199,130 B1 * | 3/2001 | Berglund et al. | 710/302 |
| 6,262,900 B1 | 7/2001 | Suntio | |
| 6,396,167 B1 | 5/2002 | Simburger et al. | |
| 6,396,169 B1 * | 5/2002 | Voegeli et al. | 307/52 |
| 6,421,259 B1 * | 7/2002 | Brooks et al. | 363/84 |
| 6,470,382 B1 * | 10/2002 | Wang et al. | 709/220 |
| 6,563,294 B2 * | 5/2003 | Duffy et al. | 323/283 |
| 6,754,720 B1 * | 6/2004 | Packer | 710/3 |
| 6,788,035 B2 * | 9/2004 | Bassett et al. | 323/272 |
| 6,915,440 B2 | 7/2005 | Berglund et al. | |
| 6,936,999 B2 | 8/2005 | Chapuis | |
| 6,949,916 B2 * | 9/2005 | Chapuis | 323/282 |
| 6,965,502 B2 * | 11/2005 | Duffy et al. | 361/18 |
| 7,000,125 B2 | 2/2006 | Chapuis et al. | |
| 7,049,798 B2 * | 5/2006 | Chapuis et al. | 323/282 |
| 7,080,265 B2 * | 7/2006 | Thaker et al. | 713/300 |
| 7,082,488 B2 * | 7/2006 | Larson et al. | 710/301 |
| 7,206,944 B2 * | 4/2007 | Odaohhara et al. | 713/300 |
| 2003/0070020 A1 * | 4/2003 | Kondo et al. | 710/120 |
| 2003/0142513 A1 * | 7/2003 | Vinciarelli | 363/17 |
| 2004/0093533 A1 | 5/2004 | Chapuis et al. | |
| 2004/0123164 A1 * | 6/2004 | Chapuis et al. | 713/300 |
| 2004/0123167 A1 * | 6/2004 | Chapuis | 713/300 |
| 2004/0135560 A1 * | 7/2004 | Kernahan et al. | 323/282 |
| 2004/0255070 A1 * | 12/2004 | Larson et al. | 710/305 |
| 2006/0172783 A1 * | 8/2006 | Leung et al. | 455/572 |
| 2006/0172787 A1 * | 8/2006 | Ellis et al. | 463/1 |

OTHER PUBLICATIONS

Jerry G. Williford and James T. Dubose; "30 kVA LF/VLF Power Amplifier Module"; IEEE Military Communications Conference (MILCOM '95); Nov. 1995; pp. 748-751, vol. 2.

R. Sebastian, M. Castro, E. Sancristobal, F. Yeves, J. Peire, and J. Quesada; "Approaching hybrid wind-diesel systems and Controller Area Network"; IEEE 28$^{th}$ Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; http://www.cd4power.com/data/apnotes/acan-02.pdf; 92 pages.

James P. Earle; "IPMI/IMPB Satellite Controller Test Procedure" (Application Guide); C&D Technologies, Inc.; www.cdpowerelectronics.net/products/appnotes/acan04.pdf; 12 pages.

"How to Design Battery Charger Applications that Require External Microcontrollers and Related System-Level Issues"; Dallas Semiconductor; www.maxim-ic.com/appnotes.cfm/appnote_number/680; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; http://focus.ti.com/lit/an/slva069/slva069.pdf; May 1999; 12 pages.

"HDX-600P HOT SWAP—600 Watts—1U High"; Switching Power, Inc.; www.switchpwr.com/hdx-600p.pdf; 2 pages.

"HDSX-600P: I$^2$C Serial Bus Interface (for IPMI implementation):"; Switching Power, Inc.; www.switchpwr.com/I2C.pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; IEEE; 1998; pp. 345-348.

"SPI—Appnotes: Alarm & Monitoring Signals"; Switching Power Inc.; 2 pages; www.switchpwr.com/alarm_signals.pdf.

"TDA8020HL Dual Smart Card Interface—Objective Specification v4.2—Data Sheet"; Feb. 24, 2001; 22 pages; Philips Semiconductors;.

Chrisotphe Chausset; "Application Note—TDA802OHL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; www.ednmag.com.

H. Taylor and L.W. Hruska; "Standard Smart Batteries for Consumer Applications" Proceedings of the Tenth Annual Battery Conference on Applications and Advances; Jan 1995; p. 183; Long Beach, CA, U.S.A.

"3-V to 6-V Input, 6-A Output Tracking Synchronous Buck PWM Switcher with Integrated FETs (SWIFT™) for Sequencing"; Oct. 2002-Apr. 2005; 21 pages; Texas Instruments Incorporated; http://focus.ti.com/lit/ds/symlink/tps54680.pdf.

"Programmable Four-Channel Step-Down DC/DC Converter"; Texas Instruments Incorporated; 2005; 16 pages; http://focus.ti.com/lit/ds/symlink/tps54900.pdf.

"LNBH21—LNB Supply and Control IC with Step-up Converter and I$^2$C Interface" (Datasheet); Apr. 2004; 20 pages; STMicroelectronics; www.st.com/stonline/products/literature/ds/9890.pdf.

"Smart Battery System Specifications—System Management Bus Specification"; Dec. 11, 1998; 39 pages; SBS Implementers Forum.

"Advanced Configuration and Power Interface Specification"; Feb. 2, 1999; 397 pages; Intel Microsoft Toshiba.

"The I$^2$C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997-Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. RS-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); SUMMIT Microelectronics, Inc.; www.summitmicro.com/prod_select/summary/sms66/SMS66DS.pdf; 2003; 26 pages;.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.

T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.

"Installation Guide—Agilent Technologies MPS Mainframe Model 66000A"; Apr. 2000; 29 pages; Agilent Technologies; Malaysia.

"Chemistry-Independent Battery Chargers"; Maxim Integrated Products; http://pdfserv.maxim-ic.com/en/ds/MAX1647-MAX1648.pdf; 25 pages.; Sunnyvale, CA, U.S.A.

Ron Vinsant, John Difiore and Richard Clarke; "Digitally-controlled SMPS extends power system capabilities"; Powerconversion & Intelligent Motion; 1994; pp. 30-37; vol. 20, No. 6.

Office Action of Sep. 20, 2006, in U.S. Appl. No. 10/820,976, 19 pages.

Office Action of Feb. 21, 2007, in U.S. Appl. No. 10/820,976, 12 pages.
Final Office Action of Aug. 14, 2007, in U.S. Appl. No. 10/820,976, 12 pages.
Advisory Action of Oct. 26, 2007, in U.S. Appl. No. 10/820,976, 3 pages.
Examiner's Answer of Mar. 18, 2008, in U.S. Appl. No. 10/820,976, 18 pages.
Office Action of Jun. 17, 2008, in U.S. Appl. No. 10/820,976, 13 pages.
Office Action of Mar. 6, 2008, in U.S. Appl. No. 11/356,674, 39 pages.
Office Action of Jun. 16, 2008, in U.S. Appl. No. 11/405,293, 20 pages.
Office Action of Nov. 13, 2006, in U.S. Appl. No. 11/405,294, 35 pages.
Final Office Action of May 8, 2007, in U.S. Appl. No. 11/405,294, 37 pages.
Office Action of Jul. 25, 2007, in U.S. Appl. No. 11/405,294, 35 pages.
Final Office Action of Dec. 27, 2007, in U.S. Appl. No. 11/405,294, 32 pages.
Advisory Action of Feb. 19, 2008, in U.S. Appl. No. 11/405,294, 3 pages.
Office Action of Oct. 9, 2007, in U.S. Appl. No. 11/425,489, 35 pages.
Final Office Action of Apr. 4, 2008, in U.S. Appl. No. 11/425,489, 29 pages.
Office Action of Aug. 20, 2008, in U.S. Appl. No. 11/425,489, 37 pages.
Office Action of Aug. 19, 2008, in U.S. Appl. No. 11/435,629, 31 pages.

* cited by examiner

METHOD FOR USING A MULTI-MASTER MULTI-SLAVE BUS FOR POWER MANAGEMENT

PRIORITY CLAIM

This application claims benefit of priority of provisional application Ser. No. 60/599,369 titled "Method For Using A Multi-Master Multi-Slave Bus For Power Management" and filed Aug. 6, 2004, which is hereby incorporated by reference as though fully and completely set forth herein.

BACKGROUND OF THE INVENTION

1. Field of the Invention

This invention relates generally to the field of data communications, and more particularly, to the design of bus interfaces.

2. Description of the Related Art

Power distribution in complex systems is often accomplished by distributing a high-voltage, low-current power source to a set of local direct-current to direct-current (DC-to-DC) converters. These converters, typically known as point-of-load (POL) devices, convert the higher voltage to a level more appropriate for the load or multiple loads that require power. Generally, each POL may be configured to generate a different voltage potential or multiple POLs may be configured to generate the same voltage potential. POLs generating the same voltage potential may be designed to drive separate loads. Similarly, two or more POLs may be connected in parallel to drive one or more common loads.

In systems that utilize multiple POL devices, it is common for the POL devices to exchange information in order to implement necessary power management features. Typical power management features may include voltage tracking, load balancing, sequencing, phase spreading, and clock synchronization. With the rising complexity and robustness requirements of many systems, the ability to monitor and control the power distribution sub-system has become increasingly more critical. Traditionally, information exchanged by POL devices has been represented by analog voltage and/or current signals. There are, however, several advantages to representing the exchanged information as digital data that may be transferred across a bus interconnecting all related POL devices. Monitoring of power distribution sub-systems has typically been implemented via a standard digital interface coupling the major components of the power distribution system to a host microprocessor (oftentimes identified as a Local Controller). The digital interface may allow the Local Controller to continuously monitor the health of the power system. It may also control the power system in order to implement system-level features such as standby and sleep modes.

One digital interface that is particularly well suited for such applications is the I2C (Inter-IC) bus. The I2C bus is a multi-master, multi-slave, two-wire bus that offers support for any device on the bus to access any other device. Transactions on the I2C bus typically consist of a start event, a destination slave address, a read/write bit, and a variable number of data bytes. The transactions are generally terminated by a stop event or another start event. The data byte immediately following the destination slave address may be interpreted as a command or tag byte, which identifies the nature and/or type of the packet.

Figure 1:
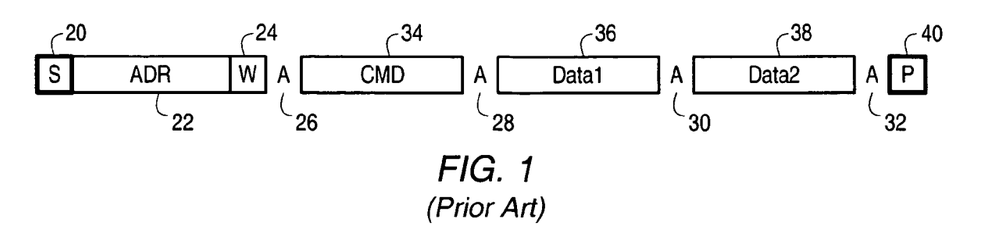
FIG. 1 shows the basic packet structure of an I2C packet according to prior art.

FIG. 1 shows the basic packet structure of an I2C packet 100, which may contain data to be transferred or written to a slave device. Packet 100 may include a start bit "S" 20 signaling the beginning of the communication from the master. This may be followed by a unique slave address byte "ADR" 22, with the most significant bit (MSB) coming first. The subsequent Read/Write bit 24, typically the eighth bit after "S" 22, specifies whether the slave is to receive (typically a '0' value) or to transmit (typically a '1' value). The Read/Write bit 24 may be followed by an acknowledge bit "A" 26 issued by the receiver, acknowledging receipt of the previous byte. Then the transmitter (slave or master, as indicated by the Read/Write bit) may transmit a data byte 34 starting with the MSB. In the example packet of FIG. 1, the slave is to receive and the first byte following the slave address byte 22 is a command byte "CMD" 34 sent by the master. At the end of the byte, the receiver may issue a-new "A" 28. This 9-bit pattern may be repeated until all the required bytes have been transmitted, in this case Data1 36 and Data2 38, and acknowledge bit following each byte. In a write transaction, as illustrated in FIG. 1, when the master is done transmitting, it may monitor the last acknowledge bit, that is, "A" 32, then issue a stop condition "P" 40. In a read transaction (slave transmitting), the master may not acknowledge final byte 38, thereby indicating to the slave that the slave's transmission is completed. The master may then issue "P" 40.

Figure 2:
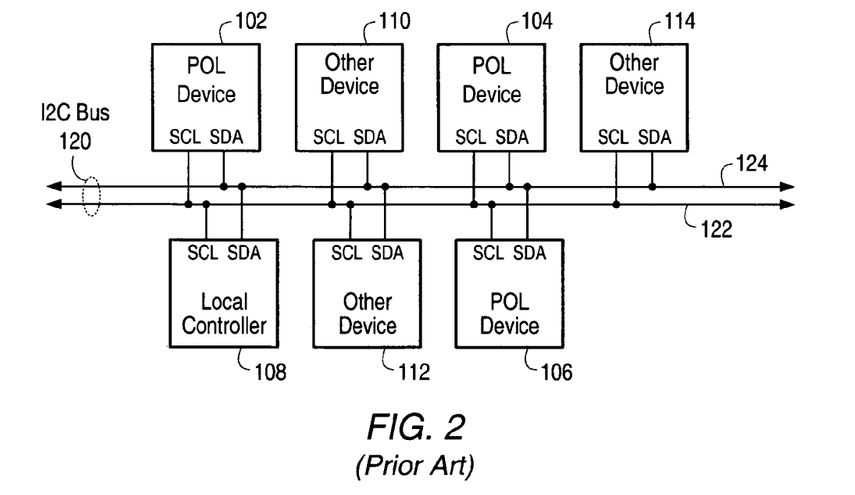
FIG. 2 shows a typical system configuration with POL and non-POL devices and a local controller coupled to an I2C bus, according to prior art.

FIG. 2 shows a typical configuration in which multiple POL devices 102, 104, and 106 are coupled together via I2C bus 120 comprising data signal (SDA) line 124 and clock signal (SCA) line 122, which also couples a Local Controller 108 and other devices 110, 112, and 114 that are not directly related POL devices 102, 104, and 106. Each of devices 102, 104, 106, 110, 112, and 114 must be responsive to a unique address, which is its slave address. The slave address may be defined for a device or programmed into a device in several possible ways. For example, the address may be "hard wired" into the device by design. Alternatively, the address may be determined by the connections of one or more pins on a device, with the one or more pins dedicated to selecting the address to which the device will respond. In yet another configuration, the device may contain non-volatile memory into which the slave address as well as other configuration information may be programmed during manufacturing or during a configuration operation performed to prepare the device for use in a particular system or application.

Figure 3:
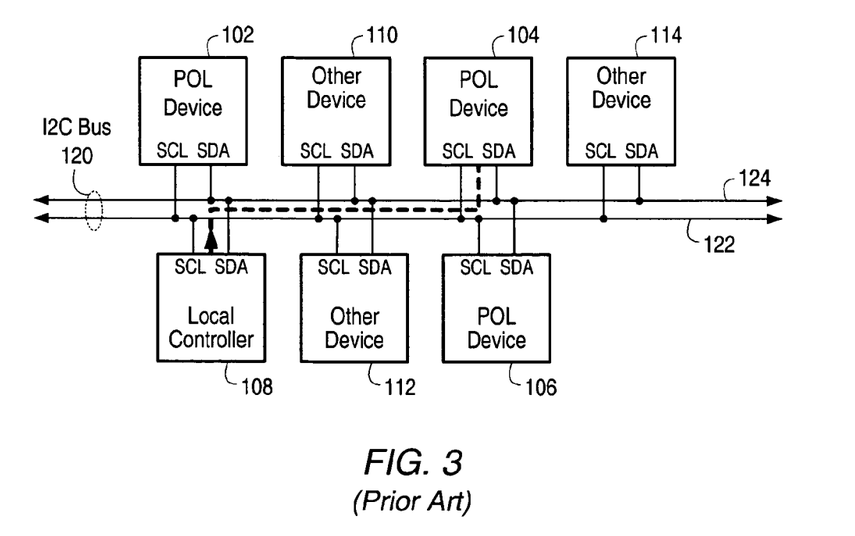
FIG. 3 illustrates a simplified transfer of a packet being from a Local Controller to a POL device, according to prior art.

During typical operation, Local Controller 108 may address each POL and/or other device by its unique slave address as required, writing control information and reading status and data. FIG. 3 is a simplified illustration of a packet being transferred from Local Controller 108 to POL device 104. Each of the devices on shared I2C bus 120 may receive the packet sent by Local Controller 108. However, only POL device 104 would recognize the address at the start of the packet as its own. POL device 104 would thus respond to the packet initiated by Local Controller 108, receiving or supplying data as required.

Figure 4:
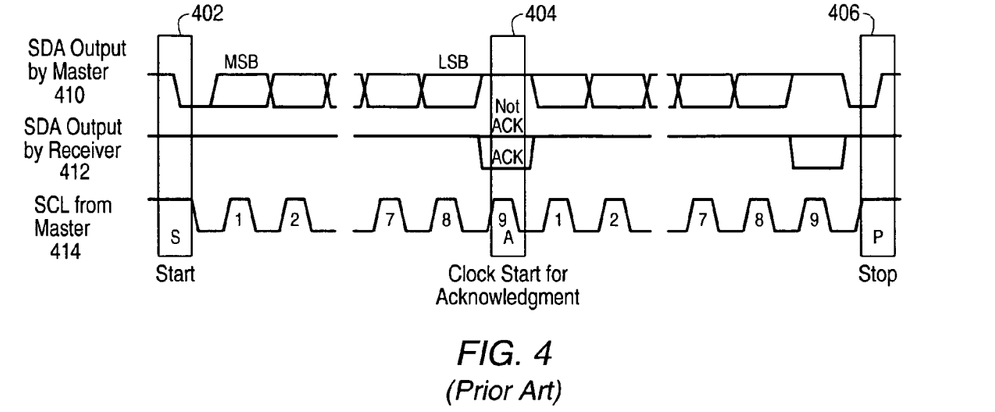
FIG. 4 shows the basic bus waveforms on the shared SDA and SCL bus wires of an I2C bus, according to prior art.

FIG. 4 show the basic bus waveforms on the shared SDA (410 and 412), and SCL (414) bus wires. The bus connections of each device connected to the bus are typically of an "open-drain" nature, with an external pull-up device, generally a resistor or current source (not shown), on each shared signal wire. Each device connected to the bus has the ability to drive the signals to a low or logic 0 level or to not drive it at all. If no device is "pulling" the bus low, the external pull-up typically causes the bus signal to remain at a high or logic 1 level. Also illustrated in FIG. 4 are, a transmission start 402, corresponding for example to "S" 20 in FIG. 1, the MSB through LSB of a slave address byte, corresponding for example to "ADR" 22, and acknowledge 404, corresponding for example to "A" 26, followed by a data byte, corresponding for example to Data2 38, and a stop 406, corresponding for example to "P" 40.

Another bus standard, developed after the I2C bus standard, is the SMBus (System Management Bus), which is backward compatible with the I2C bus standard while introducing additional features to support error detection, hazard recovery, and dynamic address assignment among others. It should be noted that both the I2C bus and the SMBus have predefined means for identifying a slave or destination device, but neither has predefined means for identifying the master or source of a bus transaction. The information transfer requirements of several common power management features will now be presented below.

Figure 5:
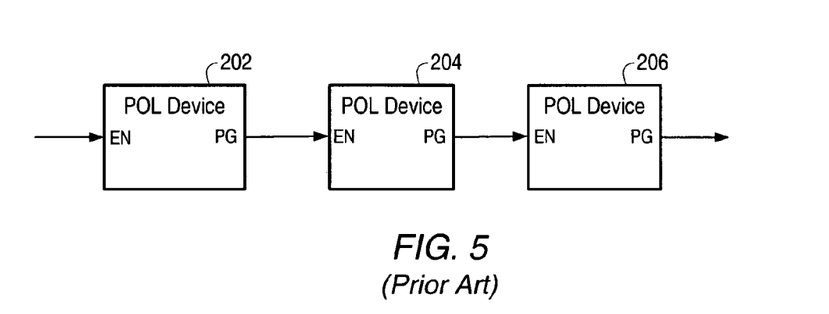
FIG. 5 shows one possible way of linking of POL devices, according to prior art.

It is a common requirement that the POL devices in a system enable and disable their power outputs in a predefined order, or sequence. This has commonly been referred to as "sequencing", and is necessary to avoid both temporary and permanent interference with the operation of the system. The sequencing is traditionally accomplished by connecting a "POWER GOOD" (PG) output pin of each POL device to an "ENABLE" (EN) input pin of the next POL device to be enabled. This is illustrated in FIG. 5, where the PG pin of POL device 202 is coupled to the EN pin of POL device 204, while the PG pin of POL device 204 is coupled to the EN pin of POL device 206. Each POL device may assert its PG pin when the output of the POL device has met some predefined condition or reached some predefined state. This event may then allow the next POL device to enable its output followed by asserting its own PG pin.

Figure 6:
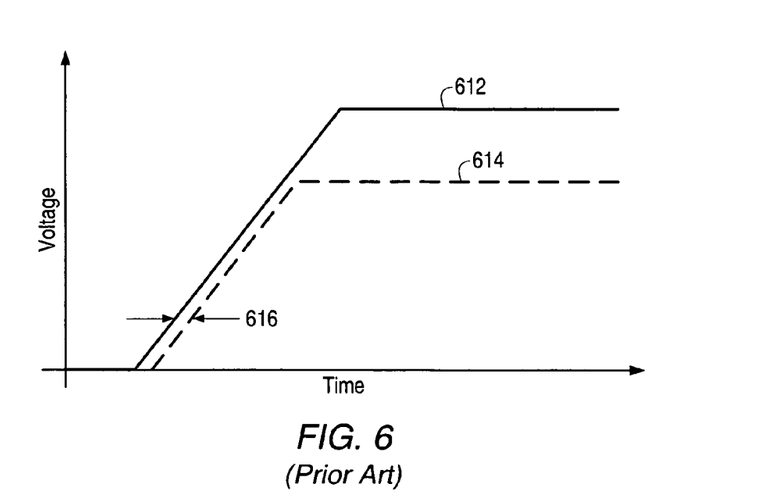
FIG. 6 shows a diagram featuring the respective output voltages of a first POL device, considered the master device, and a second POL device, considered the slave device, as a function of time, according to prior art.

As an alternative to sequencing, some systems may require that multiple POL devices enable their outputs simultaneously, while also operating to have their outputs maintain a predefined relationship with one another. This has commonly been referred to as "voltage tracking". For example, a given POL device may be required to never allow its output to exceed that of another designated POL device as the POL devices ramp their output voltages. FIG. 6 shows a diagram featuring the respective output voltage 612 of a first POL device, considered the master device, and the respective voltage 614 of a second POL device, considered the slave device, as a function of time. As illustrated, the master device and slave device voltage outputs, 612 and 614, respectively, are enabled simultaneously, with only a nominal delay 616 due to the communication delay that exists between the two devices. As also illustrated, the master device output 612 and the slave device output 614 maintain different values in a predefined manner. Traditionally, the analog output of the master POL device has been connected to an analog input of the slave POL device in order to implement the tracking feature.

In digital implementations of power conversion devices, the output voltage generated during turn-on and turn-off may be controlled by a precision digital-to-analog converter driven by a digital ramp generator. If the oscillator used to drive the ramp generator is precise, and the POL devices are enabled simultaneously, their outputs may ramp together in a predictable fashion. This may provide a means for voltage tracking without the need for additional bus traffic, and is often referred to as "open-loop" voltage tracking (as described in the above paragraph). However, mismatch between the oscillators configured within different POL devices may result in the turn-on and turn-off ramps of the different POL devices to change at different rates, and thereby introduce a mismatch between the POL devices' respective output voltages.

It is often more practical to provide a large amount of supply current to a load by connecting two or more POL devices in parallel, with each POL device intended to provide a roughly equal share of the total load current. Due to possible systematic and/or random mismatches between POL devices, the respective currents provided by different interconnected POL devices may vary considerably. Various methods, such as current balancing and load sharing have typically been used to correct such current mismatches.

Typically, current balancing is accomplished by allowing the POL devices to exchange information about their respective load currents. For example, if a master POL device in the group passes its measured load current to the other POL devices in the group, the other POL devices may adjust their own respective currents such that they match the value of the current they have received from the master POL device. In addition, by virtue of the slave POL devices' outputs being connected in parallel, the master POL device's output must decrease as the slave devices increase their respective output currents, in order to maintain a constant total load current. Other methods may allow for all POL devices to pass their respective measured load currents to other members of the group. In all, the communication between POL devices for maintaining current balance has traditionally been accomplished via one or more shared analog signals.

Additionally, in order to reduce both the input and output voltage ripple, groups of switching regulators, specifically POL devices in this case, are often required to spread their switching times across the switch period such that the respective times at which the POL devices are charging their respective output capacitors (from the input bus) have minimum overlap with one another. This is generally referred to as "phase spreading". Phase spreading has typically been accomplished by configuring each POL device to switch at a set, predefined position within the switching period.

Other corresponding issues related to the prior art will become apparent to one skilled in the art after comparing such prior art with the present invention as described herein.

SUMMARY OF THE INVENTION

In one set of embodiments, a power management system may be configured to allow digital information corresponding to power management functions to be passed between POL devices using a standard multi-master multi-slave interface such as I2C bus interface or SMBus interface. POL devices may report information to multiple other POL devices while maintaining compatibility with non-POL devices also connected to the bus. Power management systems thereby designed to use a common bus to transmit digital information corresponding to power management functions may be configured without the traditional analog connections typically required in systems where multiple power management features need to be implemented.

In one embodiment, as an alternative to the dedicated analog signal connections traditionally used for communication between POL devices, each POL device is configured to generate an event on the shared bus, (such as the I2C bus), in which the POL device generating the event both identifies itself to the other POL devices on the bus, and transmits a command corresponding to one of many possible power management functions. The POL devices on the same bus may be equally configured to monitor the bus for events, and respond to the event according to the requirements inherent within the command, the POL devices thereby performing the necessary tasks to enable power management functions.

In one embodiment, information is distributed to multiple destinations, such as multiple POL devices coupled to the shared bus, by an originating device, which may be one of the POL devices, identifying itself as a master device and effectively transmitting the information to itself. The action of performing a bus write in which a given POL device may send the packet to its own address may both identify the source of the data, and may allow any slave device (e.g. POL devices configured to respond to the address of the master POL device) that needs the data to identify and receive the data from the bus during the transaction. Therefore, in addition to having its own respective assigned bus address, each POL device may be assigned or configured with one or more other addresses or address groups. The additional addresses may define one or more POL device groups, which may enable the specialized group data exchange required by various power management features. The additional address, addresses, or address groups may be used to receive data placed on the bus by a POL device acting as bus master, and to recognize the identity of that bus master POL device. Such configuration or configurations are compatible with normal features of shared buses such as the I2C and System Management Bust (SM-Bus).

In one embodiment, voltage tracking is accomplished by requiring a master POL device to transmit its target or measured output on the shared common digital bus. The slave POL device may receive the data while observing the master POL device transmission, and may use it to control its own output. The master POL device may be configured to both identify itself on the bus, and to transmit its digital output voltage. Therefore, one or more slave POL devices (configured to track the master POL device's output) may recognize the master POL device, monitor the master POL device's transmitted output voltage, and control their own output accordingly.

Current balancing functionality may be implemented by digitizing the load current information for each device and transmitting the resulting digital information across a shared digital bus. In one set of embodiments, the POL devices may also be configured to dynamically adjust their switching times based on information exchanged on the common digital bus. Other power management functions, such as phase spreading, fault recovery, clock synchronization, over-temperature shutdown, and most remaining power management functions may also be accomplished in a similar manner.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, a device coupled to a bus that is "uniquely identified by an address" refers to a device identified by an address that is not shared with any other device that is also coupled to the bus. That is, the address that identifies a specified device does not identify any other device. However, more than one address may uniquely identify a single device. For example, a device may be uniquely identified by address '34ef45' and also by address '34ef44', but neither '34ef45' nor '34ef44' may identify any other device. Furthermore, "targeting an address" during a bus operation refers to initiating the bus operation addressing a device uniquely identified by the address. For example, if a first device coupled to the bus has a specified first address that uniquely identifies the first device, and a second device initiates a write operation "targeting the specified first address", then the address information transmitted by the first device as part of initiating the write operation is the specified first address.

In one set of embodiments, a method for using a multi-master multi-slave bus for power management is realized as a broadcast technique, which may be implemented in conjunction with a pre-existing bus protocol, to co-ordinate the behavior of a plurality of devices coupled to the bus that operates according to the pre-existing bus protocol.

In one embodiment, the broadcast technique is configured to facilitate the exchange of information between a plurality of point-of-load (POL) converters or devices in a power management system. The exchanged information may have a single origination point, for example a master POL device during voltage tracking, and multiple destination points, for example slave POL devices during voltage tracking. The information may be exchanged digitally, providing improved noise immunity and reduced system complexity by minimizing the number of signals connected between devices. In one embodiment, in order to maintain a minimum number of interconnected signal lines, the signal exchange may be performed on an existing digital interface within the system.

One set of embodiments may be configured with an Inter-IC (I2C) bus for system level monitoring and control. Typically, the I2C bus and other similar busses do not inherently support transactions that require multiple destinations, and/or transactions for which the originator needs to be identified. Transactions for multiple destinations may be performed on an I2C bus via a general broadcast transaction, but a general broadcast transaction used for performing power management functions may not be compatible with other (non-POL related) devices that are also coupled to the I2C bus. In addition, while the originator of a transaction may be identified through including an identifier data byte in the transaction, such inclusion may come at the cost of additional bus traffic and may therefore lead to higher bandwidth requirements. Furthermore, the inclusion of an identifier byte in the packet may not solve the problem of addressing a selected group of POL devices.

In one embodiment, a multi-master multi-slave bus architecture may be configured to have information identified as having originated from a particular device, and to have the information distributed to multiple destinations by allowing the originating device to effectively transmit the information to itself. For example, a given POL device having address 0x01 may transmit its measured output voltage to other POL devices on the bus by performing a bus write, where the target address for the bus write is the given POL device's own address. The write operation itself may not necessarily occur, given that the POL device may act as the bus master to send the packet, and may therefore not need to respond as a slave to its own address within the packet. The action of performing a bus write in which a given POL device may be sending the packet to its own address may both identify the source of the data (e.g. address 0x01), and may allow any slave device (e.g. POL devices configured to voltage track device 0x01) that needs the data to identify and receive the needed data from the bus during the transaction.

Since in conventional use no two devices are allowed to share a bus address, it is safe for a device to perform a write to its own address without the risk of bus failure or contention. Also, since all devices not associated with power delivery may simply ignore the transaction, this method of transferring information to a set of POL devices would remain compatible with non-power devices. Furthermore, in addition to having its own respective assigned bus address, each POL device may be assigned or configured with one or more other addresses or address groups. The additional addresses may define one or more POL device groups, which may enable the specialized group data exchange required by various power management features. The additional address, addresses, or address groups may be used to receive data placed on the bus by a POL device acting as bus master, and to recognize the identity of that bus master POL device. Such configuration or configurations are compatible with normal features of the I2C and System Management Bust (SMBus), both of which allow for bus arbitration and clock stretching that may be required by master and slave devices. Packets sent to a POL device by the Local Controller may be differentiated from packets that may be transmitted by a master POL device by the value of the command or tag following the address within any given packet. Alternatively, each POL device may be configured with an additional assigned address or addresses, which are uniquely different from the respective address used by the Local Controller to address a given POL device. The additional addresses may be used exclusively for implementing a select set of features, for example power management features, in which case the use of these additional addresses may uniquely distinguish the group communication packets corresponding to that set of features from conventional bus traffic originated by the Local Controller.

Figure 7:
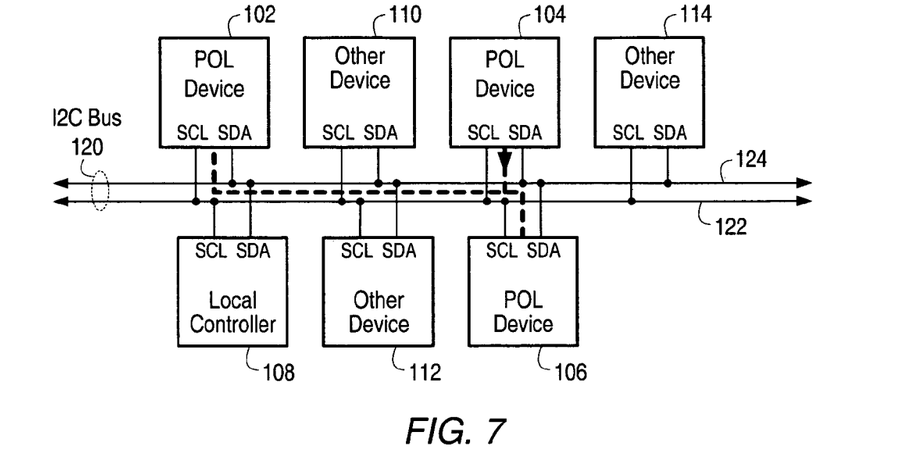
FIG. 7 shows one embodiment of a system configured with POL and non-POL devices and a local controller coupled to an I2C bus, where a transmitting POL device acts as a master POL device during a POL device to POL device transfer.

In one embodiment, each POL device required to transfer information to other POL devices first becomes the bus master and transmits its own address, followed by a transaction tag that identifies the type of transaction. FIG. 7 illustrates an example of a POL device to POL device transfer, where POL device 104 transmits a packet to POL devices 102 and 106. The packet transmitted by POL device 104 may be accessible by all other devices coupled to bus 120, including non-POL devices 110, 112, and 114. However, POL devices 102 and 106 may be the only devices configured to recognize the packet and accept the data from POL device 104. In addition to their own respective addresses, POL devices 102 and 106 may also be assigned the respective address of POL device 104, enabling them to respond to any packet addressed to POL device 104. Thus, when POL device 104 transmits a packet to itself, POL devices 102 and 106 may also recognize that packet.

In one embodiment, POL devices may be configured with an I2C, SMBus, or other shared bus interface in a novel POL controller design. Each POL device may include at least two slave address registers. The slave address registers may support concurrent comparisons with an address contained in a packet transmitted onto the bus. If the address in the packet is a match for either of the slave address register values, the controller may recognize the address and may respond to the packet, receiving data written by the external master if the packet is writing data to the slave device identified by the address, and providing data to the external master if the packet reads data from the slave device identified by the address.

Figure 10:
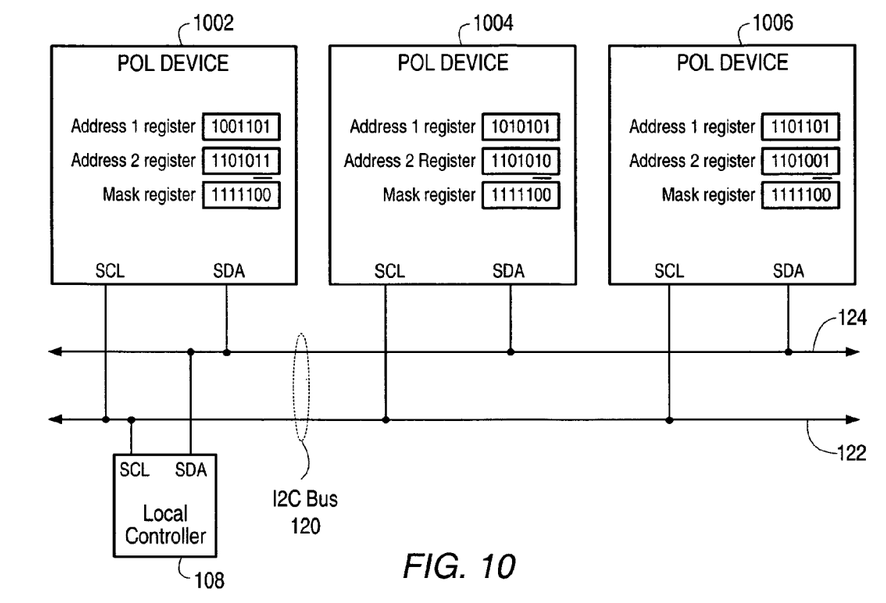
FIG. 10 shows one embodiment of a system configured with POL devices coupled to an I2C bus, where each POL device is configured with multiple address registers.

FIG. 10 shows one embodiment of a group of slave address and mask registers configured in POL devices 1002, 1004, and 1006. Address 1 register may be programmed with a slave address uniquely identifying the POL device in which the Address 1 register has been configured. For example, the Address 1 register in POL device 1002 may be programmed with an address ('1001101' in FIG. 10) that uniquely identifies POL device 1002. POL devices 1004 and 1006 may similarly be identified by the unique addresses programmed in their respective Address 1 registers. The unique respective slave address thus assigned to each respective POL device may be used by Local Controller 108, which may also be coupled to SDA bus 124 and SCL bus 122, when addressing any one or more of POL devices 1002, 1004, and 1006 for status and/or control purposes. It should be noted that while only three POL devices are shown for illustrative purposes in FIG. 10, more or less POL devices may be coupled to I2C bus 120 as required. Alternatively, a shared bus other than I2C may be used, for example an SMBus.

Referring again to FIG. 10, the Address 2 register may be programmed with a second unique respective slave address for POL devices 1002, 1004, and 1006. In one set of embodiments, a respective Mask register may be associated with each Address 2 register. The bits in the Mask register may modify the address recognition function performed with the Address 2 register. For example, bits in the Mask register that are set to logic '1' may identify corresponding bits in the Address 2 register that must match the corresponding bits in the packet address for the address programmed into the Address 2 register to be recognized as a matching address. Bits in the Mask register that are set to logic '0' may identify corresponding bits in the packet address that do not have to match corresponding bits in the Address 2 register for the packet address to be recognized as a match for the address programmed into the Address 2 register. The '0' bits in the mask register may therefore define a group of addresses, all of which may constitute a match for an address programmed into the Address 2 register.

For example, if the 7 address bits in the Address 2 register are '1101011', as shown for POL device 1002 in FIG. 10, and the 7 bits of the Mask register are '1111100', as also shown for POL device 1002, a group of four addresses may be defined. These four addresses may be '1101000', '1101001', '1101010' and '1101011'. The two LSBs may have any value as long as the five MSBs match. The four addresses in the example above may be assigned to individual POL devices 1002, 1004, and 1006, as exemplified by '1101010' being programmed into the Address 2 register of POL device 1004 and '1101001' being programmed into the Address 2 register of POL device 1006. Each of POL devices 1002, 1004, and 1006 in the group may use the address programmed into its respective Address 2 register when sending a broadcast packet to the group, where every other POL device in the group may consequently recognize the address as matching the masked programmed address in its respective Address 2 register, and accept the packet as a group transmission. In addition, the full, unmasked address contained within the packet may uniquely identify which member of the group was the originating device.

It should be noted that the number of bits within an address register and the number of address registers within each POL device were selected for illustrative purposes, and alternative embodiments may be configured with buses featuring packet sizes other than one byte, and may include more or less than two address registers and one mask register, where an address register and/or mask register may be configured with more or less than seven bits.

Figure 11:
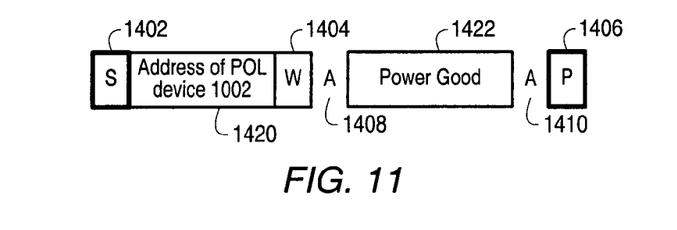
FIG. 11 shows one embodiment of a packet structure for a POL device issuing its own respective "power good" event.

Example packet tags transfers (such as described above) may include, but may not be limited to, a "power good" event tag, a "power fail" event tag, a measured output voltage tag, a measured load current tag, a fault event tag, or various configuration information tags. For transactions that include data, the tag may be followed by the actual digital data. Power sequencing functionality may be implemented by configuring any given POL device to enable its output, following a transmitting POL device having issued its own respective "power good" event, as illustrated in FIG. 11. The packets shown in FIG. 11 may represent a POL device, for example POL device 1002 from FIG. 10, transmitting a "power good" event tag to the bus, such as I2C bus 120 in FIG. 10. As part of first data byte 1420, POL device 1002 may transmit its own unique address, identifying itself as the originating device, with the "power good" tag following in data byte 1422. Other POL devices that have thus been configured, for example POL devices 1004 and 1006 (also of FIG. 10) may detect the "power good" event on the bus, and may respond accordingly. Similarly, the other configured POL devices 1004 and 1006 may each issue their own respective "power good" transaction on the bus when appropriate.

For voltage tracking, all POL devices configured to track a particular POL device may monitor the bus for the particular POL device's transactions as determined by the particular POL device's address and tag, and may control their own outputs according to the data values retrieved from those transactions. Current sharing and other power management features may also be implemented in similar fashion. In addition, a given POL device's configuration information may similarly be transmitted to other POL devices. For example, each POL device may transmit its programmed target voltage to the other POL devices, allowing the other POL devices to determine if their own respective target voltage is larger or smaller than the transmitted voltage value. The other POL devices may thereby automatically configure themselves to sequence or track according to a prescribed order, such as a "largest output first" order. For example, upon having generated 5V, 3V and 2V outputs, the 5V POL device may detect based on transmitted configuration information that it should enable first, followed by the 3V POL device, then the 2V POL device. A group of POL devices may therefore be configured to automatically sequence according to their respective target voltage levels.

Other power management features including, but not limited to, phase spreading, fault recovery, clock synchronization, and over-temperature shutdown may also be implemented in a similar manner. Phase locking—when a group of POL devices are configured to lock with switching clocks in phase—may also be accomplished in a similar manner by transmitting data or edges on the standard bus.

Figure 8:
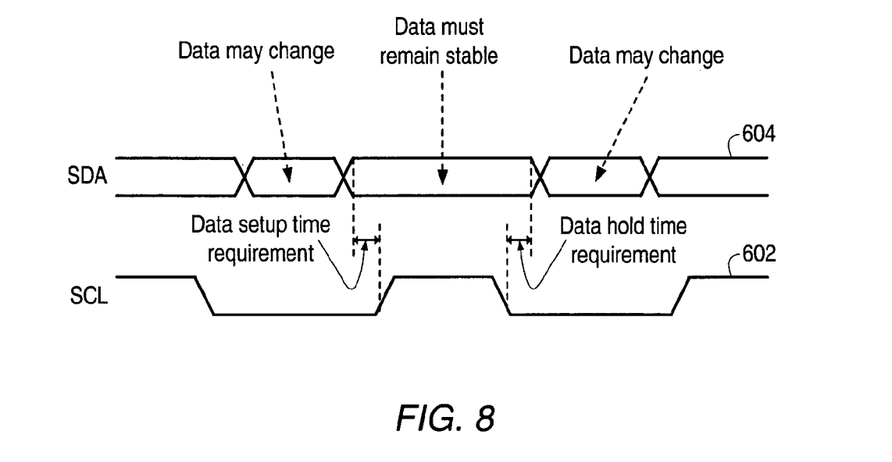
FIG. 8 shows a timing diagram illustrating data setup and hold time requirements for regular data transfer over I2C bus.

In one set of embodiments, high bit-rate data may be transmitted via a low bit-rate standard synchronous bus while maintaining compatibility with existing bus devices. Synchronous bus architectures typically distribute a clock signal and one or more data signals. Each pulse on the clock signal may trigger the transfer of one bit of information on the data signals. In the case of the I2C bus, the data signal SDA 604 may transition to the next bit value to be transmitted after each falling edge of the clock signal SCL 602, as illustrated in FIG. 8. According to the I2C bus standard, data transitions on SDA line 604 may occur only while SCL signal 602 resides in a low state, and the data must remain stable while SCL 602 resides in a high state, as also illustrated in FIG. 8. SDA 604 transitions that occur while SCL 602 resides in a high state may be used to define the "start" condition and "stop" condition for the bus protocol. According to the I2C bus standard, the "start" and "stop" conditions may be generated by the bus master, and are used to start and end transmission of a packet on the bus.

Figure 9:
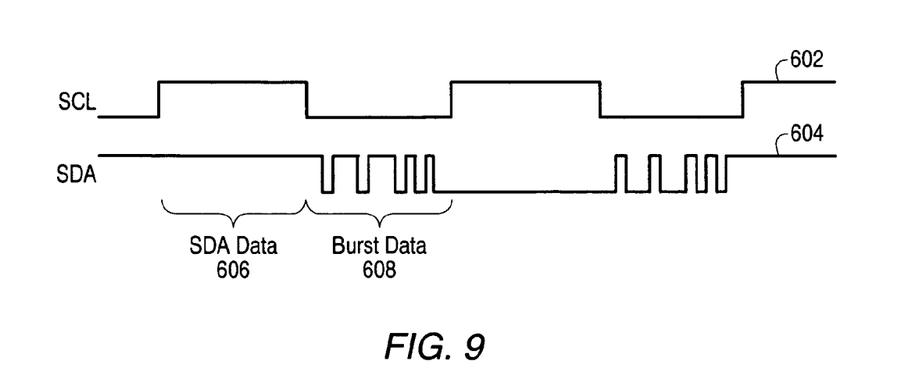
FIG. 9 shows a data burst transfer on the SDA signal bus according to one embodiment.

Standard devices on a bus like the I2C bus are generally configured to ignore transitions on SDA line 604 while SCL signal line 602 resides in a low state. The clock rate typically used in such systems may be relatively low. Furthermore, the I2C specifications and related SMBus specifications include clock stretching capability, that is, where both master and slave devices may be able to extend the time period during which SCL signal 602 resides in a low state. Therefore, data traffic may be embedded on SDA line 604 even while SCL signal 602 resides in a low state. In one embodiment, additional data is transmitted in bursts on the data signal (SDA) while the bus clock (SCL signal) resides in its low state. As illustrated in FIG. 9, SDA data 906 may be stable while SCL signal line 902 resides in a high state, as required by the I2C bus specification, for example. The data transitions of burst data 608 on SDA signal line 904 may be ignored by other devices, as data burst 608 occurs while SLC signal line 902 resides in a low state. In other words, a device may transmit a burst of data on SDA signal line 904, following a falling edge on SCL signal line 902.

The device may be configured to guarantee that the burst has been completed by the next rising edge on SCL signal line 902 by employing the clock stretching capability of the bus, thereby meeting the setup and hold times requirements set forth in the bus specification (and also illustrated in FIG. 8). Legacy devices, that is, devices not configured to operate according to the device-to-device broadcast technique and therefore not able to recognize the data bursts, would operate normally. However, a device designed to receive and interpret the data bursts may use standard clock recovery techniques to decode and use the burst data.

In one set of embodiments, if a device other than the device transmitting data onto the bus is generating transitions on SCL line 902, the device transmitting a burst of data may employ clock stretching to insure that the next transition of SCL signal 902 to a high state does not occur during the burst. If the device transmitting the burst of data is the master device for the packet transmission, it may also control SCL 902 transitions and may insure that the burst of data is completed before the next transition of SCL 902 to a high state. For bus standards featuring a weak pull-up for driving a signal high, the transmitting device may use a strong push-pull driver during the data bursts to achieve higher bit rates. However, in the case of a multi-master bus, the data bursts may need to be inhibited until the transmitting device has acquired the bus.

In one set of embodiments, the bus addresses assigned to the POL devices (for example as shown in FIG. 10) may be used as part of the operational configuration of the POL devices. For example, the numerical order of the respective slave addresses (programmed into each respective Address 2 register in FIG. 10, for example) of a group of POL devices may also be used to establish the sequencing order of the POL devices comprised in the group, that is, the order in which the POL devices are either enabled or disabled. Also, the respective slave address of a POL device may be selected to establish the phase offset the POL device during a switching cycle. In other words, during the configuring of a POL device, the address of the POL device may be chosen such that the device becomes operable to recognize its own place within a switching cycle by examining the address that it has been assigned. For example, by examining its assigned address, a POL device might determine that it is the third in a sequence of four devices. In general, any number of features of a POL device may be configured through bus address assignments.

Figure 12:
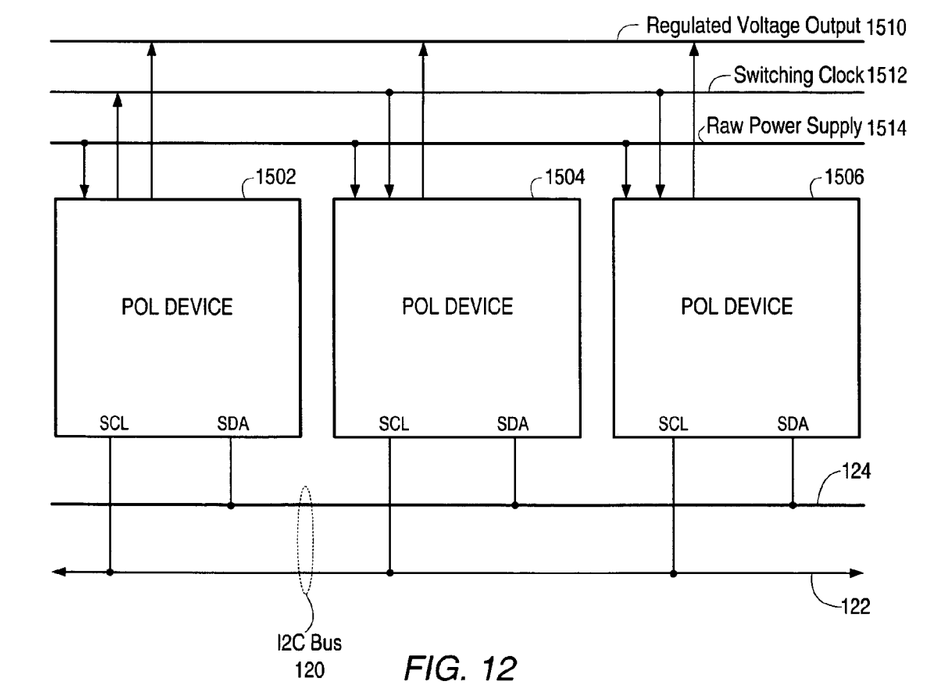
FIG. 12 shows one embodiment of a system configured with POL devices coupled to an I2C bus, with the POL devices driving a common load.

In one embodiment, a common switch clock is used by a group of POL devices that are driving a common load, as illustrated in FIG. 12. In the illustrated embodiment, POL device 1502, by virtue of its address, may recognize itself to be the lead device and output its switching clock which is wired to all the other devices in the group via switching clock line 1512. As shown, POL devices 1504 and 1506 may receive the switching clock signal output by POL device 1502. In order to minimize and/or eliminate conflict among multiple devices trying to drive common switching clock connection 1512, POL devices 1502, 1504, and 1506 may be configured such that only POL device 1502 may recognize itself to be the lead device. Therefore, each POL device may be placed in phase with respect to the common load the POL devices may be controlling via common regulated voltage output line 1510. Each POL device may receive the raw power input from raw power supply 1514. Therefore, each POL device may only require information about the size of the group and its own position within the group for the POL devices to be spread out in phase within the switching cycle. For example, lead POL device 1502 may set its phase adjustment to 0, and POL devices 1504 and 1506 may set their phase adjustment to 120 degrees and 240 degrees, respectively.

Figure 13:
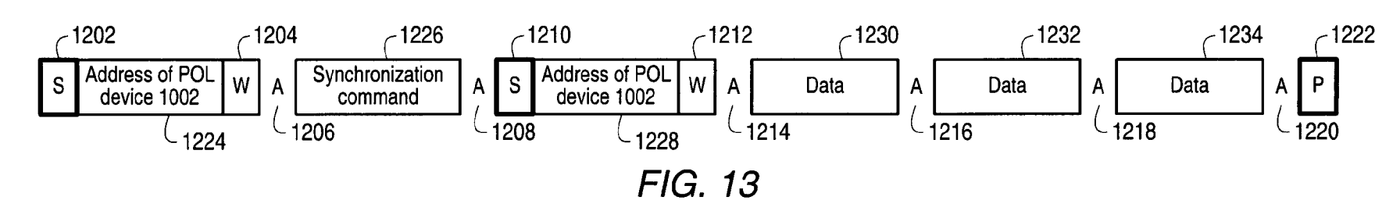
FIG. 13 shows one embodiment of a packet structure for a POL device issuing a clock synchronization command.

In one set of embodiments, POL devices or groups of POL devices that are driving different loads may have independent clocks per each load device. In such embodiments, each POL device may generate its own clock locally, from an internal oscillator. Accordingly, a mismatch between respective oscillators configured in different POL devices may be addressed by calibrating the oscillators against each other, in-system. Referring again to FIG. 10, by way of example, POL device 1002 may be identified as the voltage-tracking master device, and may send a command on bus 120 instructing all POL devices, in this case POL devices 1002, 1004 and 1006, to measure the length of a subsequent transaction on the bus. The packet structure for this command, according to one embodiment, is shown in FIG. 13. In this embodiment, POL device 1002 initiates clock synchronization by transmitting its own address in first byte 1224 and subsequent synchronization command in second byte 1226. The synchronization command may call for all POL devices in the group to measure the duration between "start" 1210 and "stop" 1222 using their own respective oscillators. POL device 1002 may transmit Data bytes 1230, 1232, and 1234 for the purpose of extending the time between "start" 1210 and "stop" 1222 to achieve the desired timing accuracy. In other embodiments, the number of data bytes transmitted by POL device 1002 may be less or more than three.

Figure 14:
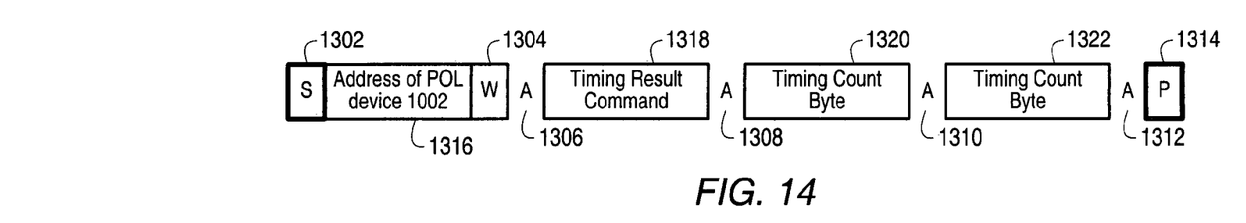
FIG. 14 shows one embodiment of a packet structure for a POL device reporting its clock synchronization count.

Following completion of the measurements, the master device, in this case POL device 1002, may send its own measured count to which the slave devices may compare their own respective counts, and determine the relative error between the master device's oscillator and their own respective oscillator. The packet structure for this command, according to one embodiment, is shown in FIG. 14. In this embodiment, POL device 1002 initiates a packet again by transmitting its own address in first byte 1316. In subsequent second byte 1318, POL device 1002 may transmit a timing result command indicating to the other POL devices that POL device 1002 is about to transmit its timing results from the preceding clock synchronization event. Timing count bytes 1320 and 1322 may represent the timing results, which the other POL devices, in this case POL devices 1004 and 1006, may use to calculate corrections to their respective clocks, thereby insuring that there is no timing error between the oscillator of POL device 1002 and the respective oscillators of POL devices 1004 and 1006. Any potential errors may be corrected by each slave POL device (again, in this case POL devices 1004 and 1006) electrically trimming its oscillator frequency, or by the ramp generator correcting the error digitally.

Figure 15:
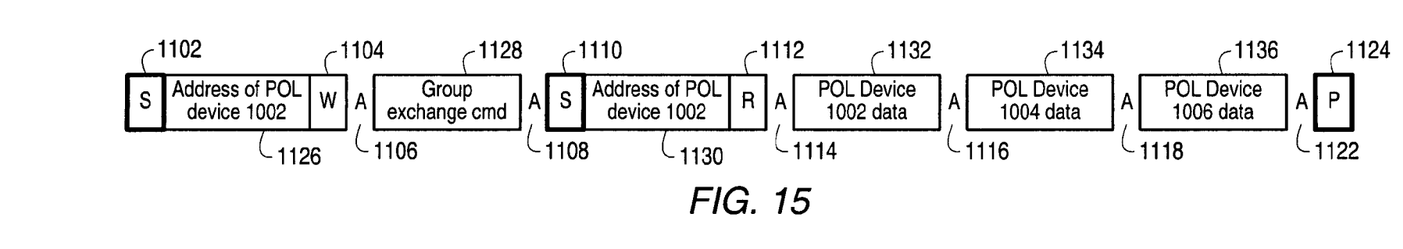
FIG. 15 shows one embodiment of a packet structure for multiple POL devices supplying data in response to a group exchange command.

In one set of embodiments, some or all of the POL devices in a POL group may write required data to the bus within a single packet that is initiated by one of the POL devices. Each POL device may have one or more assigned data elements within the single packet or packet type as determined by the tag written by the initiating POL master device. In one embodiment, the assigned addresses of the POL devices determine the order of transmission within the single packet. As shown in FIG. 15, and referencing FIG. 10, POL device 1002, acting as a POL master device, may begin transmission of the single packet by transmitting its address in first byte 1126, indicated as a "write" operation by bit 1104, followed by a "group exchange command" packet tag in second byte 1128. Once the command has been acknowledged (1108), POL device 1002 may retransmit its address in byte 1130, this time indicated as a "read" operation by bit 1112, POL device 1002 thereby requesting members of the group of POL devices to transmit data onto the bus. Each POL device, as determined by its respective address, may in response write its own portion of the data to the bus at the appropriate time as the packet progresses, as illustrated by data bytes 1132, 1134, and 1136, representing data bytes placed on bus 120 by POL devices 1002, 1004, and 1006, respectively. A single "start" bit 1110 and "stop" bit 1124 framing data bytes 1132, 1134, and 1136 is indicative of a single packet.

In one set of embodiments, when configuring various devices, for example POL devices, to communicate with each other as heretofore described, using a pre-existing bus such as an I2C bus or SMBus, only a subset of the pins normally required for a standard implementation of the pre-existing bus may be needed. In other words, proprietary bus functionality embedded in the standard bus protocol of the utilized bus (to provide the required communication capabilities for power management functions) may be accomplished with fewer pins than what a standard bus interface for the utilized bus may require. For example, in case of applications requiring an I2C interface only for implementing POL device communications, a single pin, rather than two I2C pins, may be sufficient for a single-wire bus, to implement the necessary communication capabilities for power management functions on that pin.

It should also be noted that while the above examples presented a bus write as a means for transmitting information from one POL device to another, a bus read may be used in a similar manner to transfer the information. That is, the originating POL device may effectively read from itself. However, other POL devices in its group may need to be configured to recognize the POL master's address without responding to the packet in the same manner in which they would respond to a conventional bus read from the Local Controller. In other words, the POL devices may be required to not supply data in response to the read bit. This mode of operation may involve additional non-standard device behavior, and may introduce additional overhead in the packet by adding a repeated start signal and address to accomplish setting the read bit.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system comprising:
   a bus configured to operate according to a bus protocol;
   a plurality of devices coupled to the bus, wherein the plurality of devices are configured to transmit and receive information over the bus according to the bus protocol, wherein each of the plurality of devices is uniquely identified by corresponding one or more addresses;
   wherein a first one of the plurality of devices is configured to initiate a bus operation on the bus, by placing a specified address of the one or more addresses that uniquely identifies the first one of the plurality of devices onto the bus, wherein the specified address is the initial address placed onto the bus;
   wherein the bus operation comprises transmitting specified information onto the bus;
   wherein at least a second one of the plurality of devices is configured to receive the specified address and the specified information, and utilize the specified information to perform one or more functions in response to receiving the specified address;
   wherein at least a subset of the plurality of devices constitutes a group;
   wherein for any given device in the group each one of the one or more addresses that uniquely identifies the given device comprises a respective first segment of bits and a respective second segment of bits;
   wherein each respective first segment of bits specifies the group;
   wherein each respective second segment of bits specifies the given device within the group;
   wherein each device of the group comprises:
   an address register configured to store at least one of the one or more addresses that uniquely identifies the device; and
   a mask register configured to mask out at least a portion of the address register wherein the portion corresponds to the respective second segment of bits of the at least one of the one or more addresses that uniquely identifies the device.

2. The system of claim 1, wherein the plurality of devices comprises point-of-load (POL) converters and the one or more functions comprise power management functions.

3. The system of claim 1, wherein the bus is one of: an Inter-IC (I2C) bus; and a System Management Bus (SMBus).

4. The system of claim 1, wherein the bus operation is a bus write operation or a bus read operation.

5. The system of claim 1, further comprising a local controller coupled to the bus and configured to individually access and control each of the plurality of devices through the bus.

6. The system of claim 5, wherein the plurality of devices comprises point-of-load (POL) devices; the system further comprising non-POL devices coupled to the bus; wherein the local controller is configured to access and control each of the non-POL devices through the bus.

7. The system of claim 6, wherein the one or more addresses that uniquely identify each of the plurality of devices comprise a respective first address and a respective second address for each of the plurality of devices; wherein the specified address is the respective first address of the first device; and wherein in individually accessing and controlling any given one of the plurality of devices through the bus, the local controller is configured to use the respective second address of the given one of the plurality of devices.

8. A method for communicating over a shared bus, the method comprising:
   a first device of a plurality of devices initiating a bus operation over the shared bus, wherein said initiating the bus operation comprises:
   transmitting over the shared bus a specified address that uniquely identifies the first device;
   transmitting data onto the shared bus; and
   a second device of the plurality of devices receiving the specified address and the data, and utilizing the data to perform one or more functions in response to at least a first portion of the specified address;
   wherein at least the first device and the second device of the plurality of devices constitutes a group;
   wherein for any given device in the group, each one of the one or more addresses that uniquely identifies the given device comprises a respective first segment of bits and a respective second segment of bits;
   wherein each respective first segment of bits specifies the group;

wherein each respective second segment of bits specifies the given device within the group;

wherein each device of the group comprises:
an address register configured to store at least one of the one or more addresses that uniquely identifies the device; and
a mask register configured to mask out at least a portion of the address register wherein the portion corresponds to the respective second segment of bits of the at least one of the one or more addresses that uniquely identifies the device.

9. The method of claim 8, wherein said transmitting data onto the shared bus is performed during time periods when, according to the bus protocol, data transmitted onto the shared bus is not required to remain stable.

10. The method of claim 8, wherein said transmitting the data is performed in data bursts.

11. The method of claim 8, wherein the first device is a master device and the specified address that uniquely identifies the first device identifies the master device, wherein the second device and remaining ones of the plurality of devices are slave devices; the method further comprising one or more of: the master device responding to the first portion of the specified address; and one or more slave devices responding to the first portion of the specified address.

12. The method of claim 11, wherein the bus operation is a write operation comprising the master device transmitting information onto the shared bus; the method further comprising one or more of: the one or more slave devices receiving the information;
the one or more slave devices transmitting data onto the shared bus according to the information; the one or more slave devices performing one or more functions according to the information; the master device transmitting data onto the shared bus according to the information; and the master device performing one or more functions according to the information.

13. The method of claim 11, wherein the bus operation is a write operation comprising the master device transmitting master power status information onto the shared bus; the method further comprising: the one or more slave devices receiving the master power status information; and each respective slave device of the one or more slave devices transmitting respective slave power status information onto the shared bus.

14. The method of claim 11, wherein the bus operation is a write operation comprising the master device transmitting a synchronization command; the method further comprising: the one or more slave devices receiving the synchronization command;
the master device successively transmitting a start event, the specified address, synchronization data, and a stop event; each respective slave device of the one or more slave devices successively receiving the start event, the specified address, the synchronization data, and the stop event; the master device measuring a transmission time period elapsed between the transmission of the start event and the transmission of the stop event; and each respective slave device of the one or more slave devices measuring a respective reception time period elapsed between the reception of the start event by the respective slave device and the reception of the stop event by the respective slave device.

15. The method of claim 14, wherein the master device comprises a master oscillator and each respective slave device of the one or more slave devices comprises a respective slave oscillator; the method further comprising: the master device successively transmitting a timing result command and data representing the transmission time period; the one or more slave devices receiving the timing result command and the data representing the transmission time period; each respective slave device of the one or more slave devices synchronizing its respective slave oscillator to the master oscillator according to its respective reception time period and the transmission time period.

16. The method of claim 11, wherein the bus operation is a write operation comprising the master device transmitting a group exchange command; the method further comprising: the one or more slave devices receiving the group exchange command;
the master device successively transmitting a start event and the specified address as part of a read command; the master device writing respective first data to the shared bus; the one or more slave devices successively writing respective data to the shared bus in an order determined by respective addresses uniquely identifying each of the one or more slave devices; and the master device transmitting a stop event.

17. A power management system configured to allow digital information corresponding to power management functions to be passed between point-of-load (POL) converters using a standard multi-master multi-slave interface, the system comprising:
a shared bus;
a plurality of POL converters coupled to the shared bus, wherein each of the plurality of POL converters is configured to transmit and receive information over the shared bus according to a bus protocol corresponding to the shared bus, wherein each of the plurality of POL converters is configured to be uniquely identified by respective one or more addresses;
wherein at least one of the plurality of POL converters is configured to identify itself as a master POL converter, wherein the master POL converter is configured to initiate a bus operation on the shared bus, by placing a specified address of the respective one or more addresses that uniquely identify the master POL converter onto the bus, and wherein the master POL converter is further configured to transmit specified information onto the shared bus as part of the bus operation;
wherein remaining respective ones of the plurality of POL converters are configured to identify themselves as respective slave POL converters, wherein the respective slave POL converters are configured to receive the specified address and the specified information, and utilize the specified information to perform one or more functions in response to receiving the specified address;
wherein the plurality of POL converters are comprised in a group;
wherein a first segment of bits of at least a first respective address of each of the respective one or more addresses identifies the group;
wherein a second segment of bits of at least the first respective address identifies a respective one of the plurality of POL converters within the group;
wherein each respective one of the plurality of POL converters within the group comprises:
a respective address register configured to store the respective first address of the respective one of POL converters; and
a respective mask register configured to mask out at least a portion of the respective address register, wherein the portion corresponds to the second segment of bits, thereby identifying the respective one of the POL converters as being part of the group.

18. The power management system of claim 17, wherein the respective first address of each respective one of the plurality of POL converters is assigned according to one or more operational configurations of the plurality of POL converters.

19. The power management system of claim 18, wherein the one or more operational configurations comprise: a sequencing order of the plurality of POL converters; and a phase offset of each respective one of the plurality of POL converters.

20. The power management system of claim 17; wherein the shared bus is one of: an Inter-IC (I2C) bus; and a System Management Bus (SMBus); and wherein the bus operation is one of: a bus write operation; and a bus read operation.

21. The power management system of claim 17; wherein the specified information comprises a specified power management command; wherein the slave POL converters are configured to perform a power management function corresponding to the power management command.

22. The power management system of claim 21, wherein the master POL converter is configured to perform a power management function corresponding to the specified power management command.

23. A system comprising:
a shared bus;
a plurality of point-of-load (POL) converters coupled to the shared bus, wherein each respective one of the plurality of POL converters is configured to:
initiate one or more events on the shared bus by transmitting its own address onto the shared bus, thereby also identifying itself to other ones of the plurality of POL converters;
after initiating each respective event, as part of the respective event transmit a respective command corresponding to a respective one of a plurality of power management functions;
monitor the shared bus for the transmitted own address; and
respond to the one or more respective events over the shared bus in response to recognizing the transmitted own address, wherein in responding to each respective event, the respective one of the plurality of POL converters is configured to respond according to the respective command, thereby performing one or more tasks corresponding to the respective one of the plurality of power management functions;
wherein at least a subset of the plurality of POL converters constitutes a group;
wherein for any given POL converter in the group the own address of the given POL converter comprises a respective first segment of bits and a respective second segment of bits;
wherein each respective first segment of bits specifies the group;
wherein each respective second segment of bits specifies the given POL converter within the group;
wherein each POL converter of the group comprises:
an address register configured to store the own address of the POL converter; and
a mask register configured to mask out at least a portion of the address register wherein the portion corresponds to the respective second segment of bits of the own address of the POL converter.

24. A device comprising:
a bus interface configured to interface to a bus;
a first memory element configured to store a first identifier that uniquely identifies the device, wherein a first portion of the first identifier identifies a first group wherein the device and one or more other devices are included in the first group, wherein a remaining portion of the first identifier identifies the device within the first group; and
a second memory element configured to store masking information corresponding to the first identifier, wherein the masking information masks the remaining portion of the first identifier;
wherein the device is configured to communicate with the one or more other devices through the bus interface by initiating a bus operation intended for the bus by transmitting the first identifier through the bus interface, wherein the first identifier uniquely identifies the device as a source of the bus operation, wherein the first portion of the first identifier also specifies the one or more other devices as targets of the bus operation.

25. The device of claim 24, wherein the first group is defined by a plurality of values, wherein the device and the one or more other devices are each uniquely identified by a respective one of the plurality of values.

26. The device of claim 25, wherein the plurality of values form an address range, wherein each one of the plurality of values is an address.

27. The device of claim 24, wherein the device is uniquely identified by a plurality of identifiers that includes the first identifier.

28. The device of claim 27, wherein a respective first portion of each of the plurality of identifiers identifies a respective one of a plurality of groups, wherein the device is included in the identified ones of the plurality of groups.

29. The device of claim 28, wherein each of the one or more of the other devices is included in one or more of the identified ones of the plurality of groups.

30. The device of claim 28, wherein a respective second portion of each one of the plurality of identifiers identifies the device within the respective one of the plurality of groups identified by the respective first portion of the one of the plurality of identifiers.

31. A method for communicating over a bus, the method comprising:
a first device coupled to the bus initiating a bus operation by transmitting, to the bus, a first address that uniquely identifies the first device;
the first device transmitting data onto the bus as part of the bus operation; and
a subset of remaining devices that are coupled to the bus receiving the first address and the data, and utilizing the data to perform one or more functions in response to receiving the first address;
wherein the first device and the subset of the remaining devices constitutes a group;
wherein each given device of the group comprises:
an address register configured to store a respective address that uniquely identifies the given device, wherein the respective address comprises a respective first segment of bits and a respective second segment of bits, wherein the respective first segment of bits specifies the group and wherein the respective second segment of bits specifies the given device within the group; and
a mask register configured to mask out at least a portion of the address register wherein the portion corresponds to the respective second segment of bits of the respective address that uniquely identifies the given device.

32. The method of claim 31, wherein the bus operation includes the first device transmitting a value onto the bus, wherein the subset of the remaining devices responding to the bus operation comprises one or more of the subset of the remaining devices storing the value transmitted by the first device.

33. The method of claim 31, wherein the subset of the remaining devices utilizing the data to perform one or more functions comprises one or more of the subset of the remaining devices initiating a second bus operation over the bus.

34. The method of claim 31, wherein said transmitting data onto the bus is performed during time periods when, according to the bus protocol, data transmitted onto the bus is not required to remain stable.

35. The method of claim 34, wherein said transmitting the data is performed in data bursts.

36. The method of claim 31, wherein the first device is a master device, wherein the subset of the remaining devices is a group of slave devices, wherein the method further comprises at least one of the group of slave devices responding to the bus operation according to the first segment of bits of the first address.

37. The method of claim 36, further comprising the master device responding to the bus operation according to the first segment of bits of the first address.

38. A device comprising:
  a bus interface configured to interface to a bus; and
  a first memory element configured to store a first address that uniquely identifies the device, wherein the first address comprises:
  a first segment of bits that specifies a group; and
  a second segment of bits that specifies the device within the group; and
  a second memory element configured to mask out at least a portion of the address register, wherein the portion corresponds to the second segment of bits;
  wherein the device is configured to initiate bus transactions intended for the bus, and communicate with other devices via the bus interface by transmitting information packets and receiving information packets from the other devices through the bus interface;
  wherein in initiating the bus transactions the device is configured to transmit the first address through the bus interface as a target address for the bus transactions; and
  wherein at least one of the other devices is configured to receive the first address and the information packets, and utilize information from the information packets to perform one or more functions in response to receiving the first address.

39. A device comprising:
  a bus interface configured to interface to a bus, wherein the device is operable to communicate with other devices via the bus interface;
  a first register configured to store a first address that uniquely identifies the device; and
  a second register configured as a mask register for the first register wherein an unmasked segment of bits of the first address defines an address group, wherein a masked segment of bits of the first address identifies the device within the address group;
  wherein the device and at least one of the other devices are comprised in the address group;
  wherein the device configured to initiate a bus operation intended for the bus by transmitting the first address and data through the bus interface, wherein the first address is transmitted as a target address for the bus operation; and
  wherein at least one of the other devices is configured to receive the first address and the data, and utilize at least a portion of the data to perform one or more functions in response to receiving the first address.

40. The device of claim 39, further comprising a first plurality of additional registers, each of the first plurality of registers configured to store a respective address that uniquely identifies the device.

41. The device of claim 40, further comprising a second plurality of registers, each of the second plurality of registers configured as a mask register for a respective one of the first plurality of registers, wherein a respective unmasked segment of bits of each respective address defines an additional respective address group, wherein the device and at least a subset of the other devices are comprised in the additional respective address group.

42. The device of claim 41, wherein a masked respective segment of bits of each respective address identifies the device within the additional respective address group.

* * * * *

UNITED STATES PATENT AND TRADEMARK OFFICE
CERTIFICATE OF CORRECTION

PATENT NO.         : 7,653,757 B1
APPLICATION NO.    : 11/198698
DATED              : January 26, 2010
INVENTOR(S)        : Fernald et al.

It is certified that error appears in the above-identified patent and that said Letters Patent is hereby corrected as shown below:

Column 15, Claim 10
Line 16, please delete "The method of claim 8, wherein said transmitting" and substitute -- The method of claim 9, wherein said transmitting --.

Column 20, Claim 39
Line 19, please delete "wherein the device configured to initiate" and substitute -- wherein the device is configured to initiate --.

Signed and Sealed this
Third Day of July, 2012

David J. Kappos
*Director of the United States Patent and Trademark Office*